Dec. 23, 1969   E. H. LAND ET AL   3,485,155
PROCESSING FLUID SPREADER FOR PHOTOGRAPHIC APPARATUS
Filed July 25, 1967   3 Sheets-Sheet 1
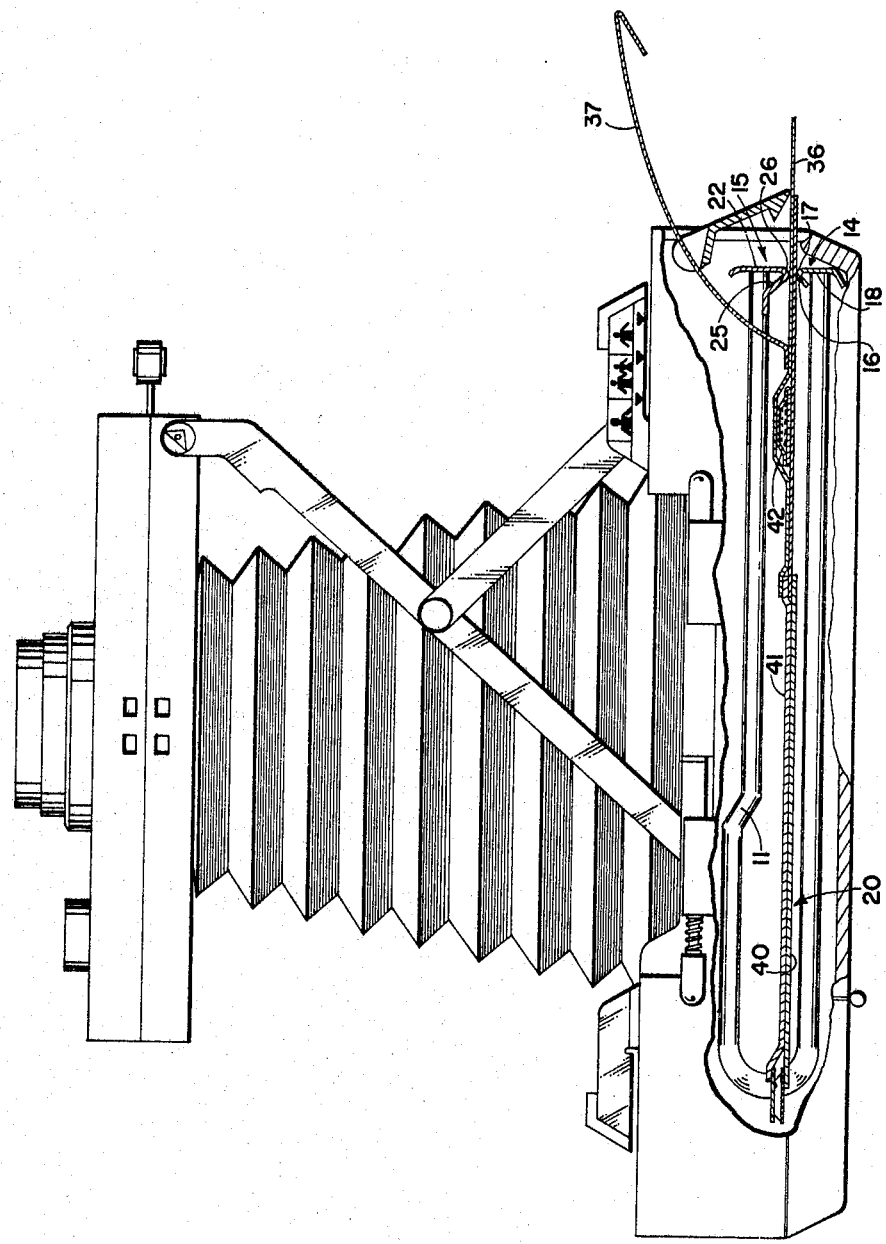
INVENTORS
Edwin H. Land
and
BY   Vaito K. Eloranta
Brown and Mikulka
and
Leonard S. Selman
ATTORNEYS Dec. 23, 1969  E. H. LAND ET AL  3,485,155
PROCESSING FLUID SPREADER FOR PHOTOGRAPHIC APPARATUS
Filed July 25, 1967  3 Sheets-Sheet 2
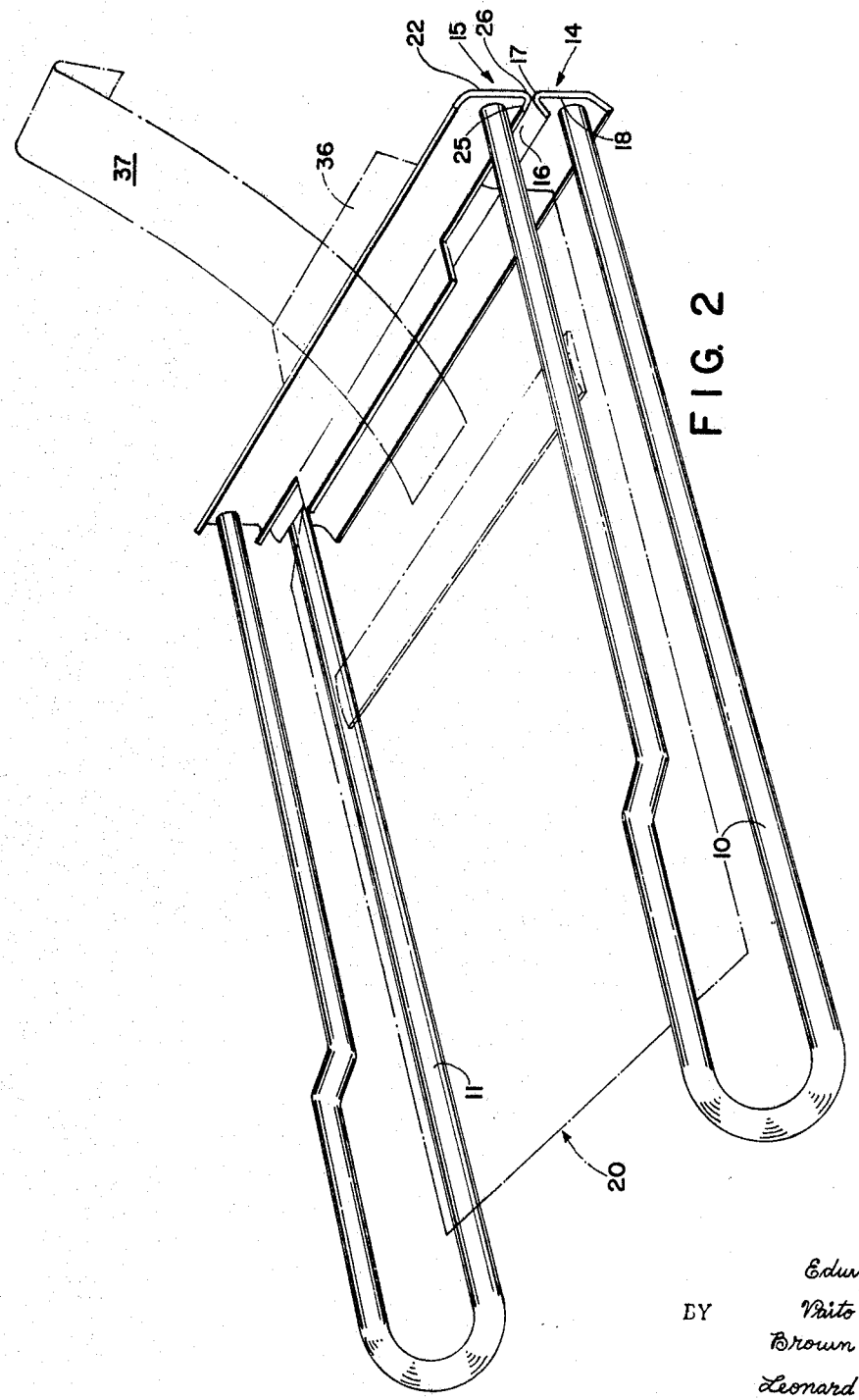
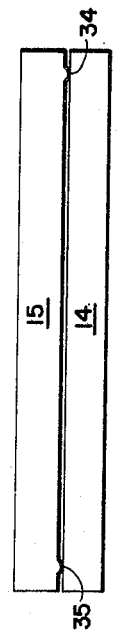
INVENTORS
Edwin H. Land
and
Vaito K. Eloranta
BY
Brown and Mikulka
and
Leonard S. Selman
ATTORNEYS

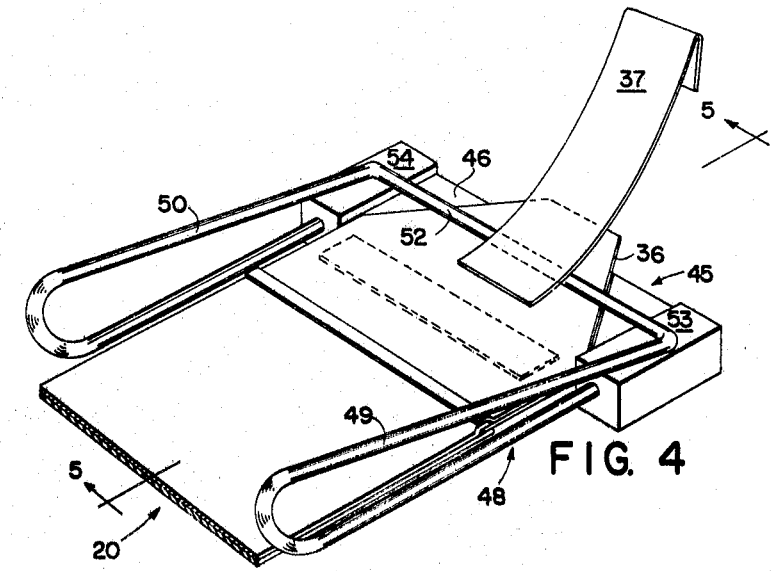
FIG. 4
FIG. 5
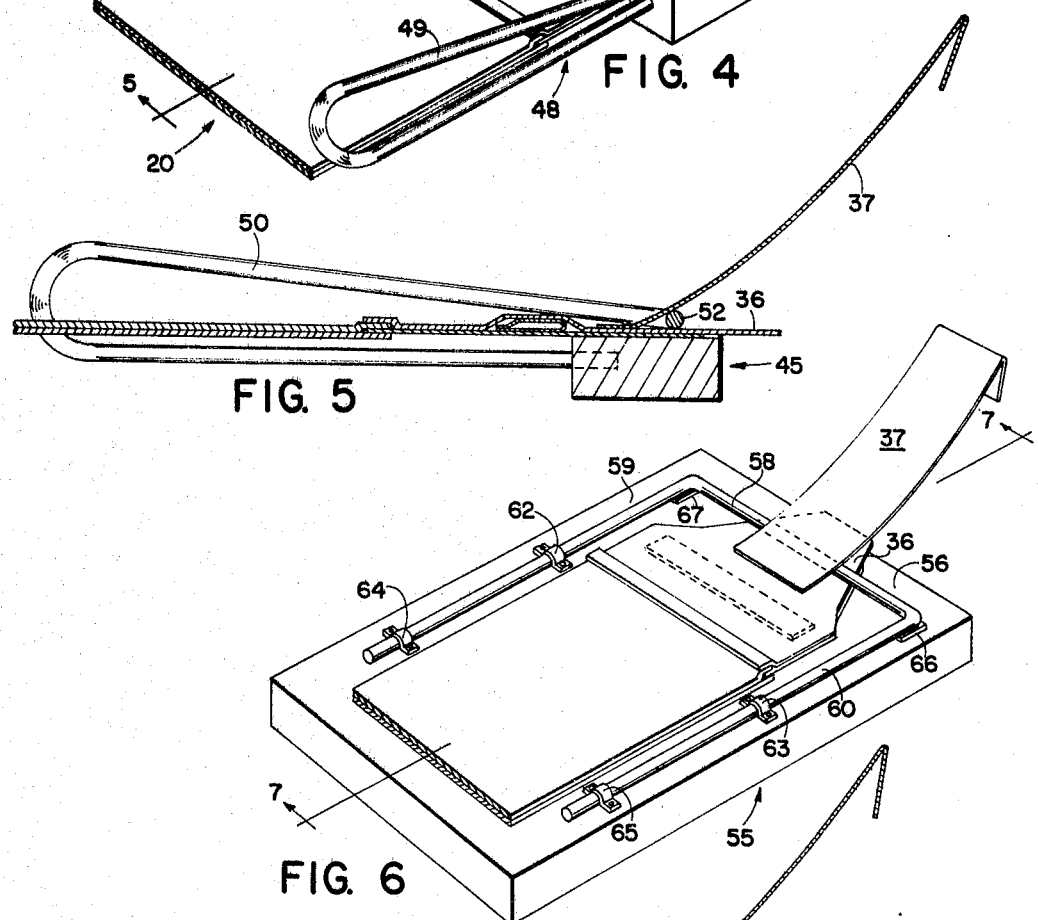
FIG. 6
FIG. 7
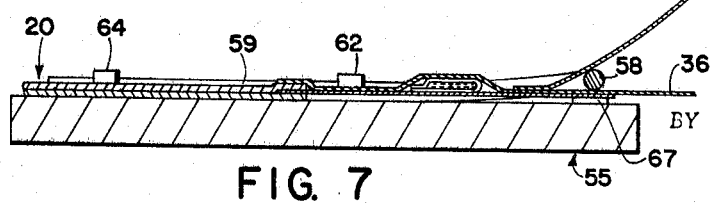
INVENTORS
Edwin H. Land
and
Vaito K. Eloranta
BY
Brown and Mikulka
and
Leonard S. Selman
ATTORNEYS

United States Patent Office

3,485,155
Patented Dec. 23, 1969

3,485,155
PROCESSING FLUID SPREADER FOR
PHOTOGRAPHIC APPARATUS
Edwin H. Land, Cambridge, and Vaito K. Eloranta,
Needham, Mass., assignors to Polaroid Corporation,
Cambridge, Mass., a corporation of Delaware
Filed July 25, 1967, Ser. No. 655,831
Int. Cl. G03b *17/50;* G03d *3/00*
U.S. Cl. 95—13     25 Claims

ABSTRACT OF THE DISCLOSURE

A photographic processing apparatus for distributing a developing fluid in contact with a photographic sheet in a self developing camera. The apparatus consists of a pair of juxtaposed pressure-applying members, held together by a pair of elongated cantilever spring elements, for distributing a liquid between a pair of superposed photographic sheets.

Cross reference to related applications

The invention disclosed herein is related to the subject matter disclosed in copending applications; Ser. No. 655,832 filed July 25, 1967; Ser. No. 655,833 filed July 25, 1967; Ser. No. 655,834 filed July 25, 1967; and Ser. No. 655,835 filed July 25, 1967 assigned to the same assignee.

Background of the invention

As shown in the photographic literature and in many U.S. and foreign patents, e.g., U.S. Patent No. 2,647,056 issued July 28, 1953 to Edwin H. Land, a photographic transfer image may be produced which involves the movement of a pair of film sheets, an exposed negative photosensitive sheet and a superposed positive receiving sheet, between a pair of juxtaposed pressure-applying members for distributing a processing liquid between and in contact with the sheets. The presure-applying members generally comprise a pair of members having adjacent surfaces defining a convergent passage or gap between them through which the sheets are moved relative to the members for advancing or spreading a quantity of a processing liquid, often quite viscous, relative to, between and in contact with the sheets in a direction opposite the direction of movement of the sheets relative to the members. The spreading of this liquid between the sheets in a uniform manner over the entire superposed surfaces is critical to the successful transfer of the photographic image and a great amount of research has been done to develop the instrumentalities to carry out this function. There are presently in use today, millions of cameras which incorporate precision ground stainless steel rollers between which the superposed film sheets are drawn for instant processing and, which up to this time have been found to be the only acceptable processing liquid spreading means for commercial use. These carefully finished rollers have been built into the camera bodies using precise bearings and supporting cradles to insure their correct alignment. All cooperating structure such as film supporting and guiding means are also built into the camera bodies and mounted in precise relationship to the rollers.

The resultant cost of manufacture of this roller system has been considerable but until recently has been considered necessary even in comparatively low priced self-developing cameras. With this background, the importance and significance of the present invention, which performs the uniform spreading of the processing liquid between the photographic sheets in a manner equal to the roller system but with a greatly simplified and less expensive structure becomes apparent.

Summary of the invention

The present invention achieves the goals of excellent performance with a simplified less costly structure by incorporating all necessary elements in an integral structure, which may even be completely removable from the camera body. Thus, the entire spreader system may be manufactured as a precision unit and the costly mounting and aligning of the separate elements in the camera body is avoided. In the preferred embodiment of the invention, the juxtaposed pressure-applying members forming the gap through which the film sheets must travel comprise sheet metal spreader members which may be precisely formed by stamping and bending operations at a rapid rate. Each spreader member not only is formed with a sheet contacting edge positioned on either side of the gap through which the film sheets are pulled, but integral therewith and formed out of the same sheet metal blanks are means for supporting and guiding the film sheets toward the gap. The supporting means for the sheet metal spreader members not only support the members in exactly aligned relationship, but in addition provide the necessary biasing force to urge the pressure-applying members toward each other with just enough force to provide a uniform spread of processing liquid between the photographic sheets with as small a pull force as possible. In the preferred embodiment of the invention, these support members take the form of a pair of pre-stressed rod spring members bent in a generally U-shape and welded to the spreader members at the ends of the spreading surfaces. Thus, the spreader members welded to the spring members form a relatively inexpensive completely removable, light-weight, compact and integral unit for use in conjunction with a photographic camera.

An alternative embodiment of the invention may include an anvil the surface of which comprises one pressure-applying member with a spreader bar mounted on said anvil comprising the other pressure-applying member. Another alternative embodiment may include a flat plate member forming one pressure-applying member with a spreader member clamped to the plate member by a pair of integrally formed supporting arms forming the other pressure-applying member.

Accordingly, it is an object of this invention to provide an improved spreading device capable of being mounted on photographic apparatus, such as a camera, in position to spread a processing liquid in a uniform layer of predetermined thickness between two layers of sheet material moved through a gap, said device being formed of sheet metal which may be stamped out and bent to shape and mounted on support members in juxtaposed position to provide said gap between them, said support members being constructed and arranged to resist further separation of the sheet metal members as the sheets are moved through the gap.

It is another object of this invention to provide an improved spreading device including a pair of pressure-applying surfaces, said surfaces being in substantially parallel juxtaposed relation to one another, one of said surfaces being the flat surface of an anvil or flat plate and the other of said surfaces being a spreader member supported in precisely aligned relationship thereto.

Brief description of the drawings

FIG. 1 is a side elevational view of a camera having mounted within and shown in cross-section, the apparatus embodying the preferred embodiment of the invention including the spring mounted sheet metal spreader members having a gap therebetween through which the photographic sheets may be drawn;

FIG. 2 is a perspective view of the processing apparatus shown removed from a camera;

FIG. 3 is a front view of the apparatus showing the gap between the spreader members;

FIG. 4 is a perspective view of an alternative embodiment of the invention shown removed from the camera;

FIG. 5 is a sectional view taken along line 5—5 in FIG. 4;

FIG. 6 is a perspective view of another alternative embodiment of the invention shown removed from the camera; and FIG. 7 is a sectional view taken along line 7—7 in FIG. 6.

Description of the preferred embodiment

The spreading of a fluid composition in a uniformly thin layer between a pair of superposed sheets may be employed for effecting a number of various photographic processes and is particularly adapted, for example, to the processing of an exposed photosensitive stratum on one of the sheets to develop a latent image in the photosensitive stratum and/or produce a positive image in the other sheet by diffusion and transfer of reagents from the photosensitive stratum through or into the fluid layer. The present invention is concerned with the provisions of a spreading device adapted to be employed, for example, with a film unit comprising a first sheet having a photosensitive surface stratum and a second sheet superposed with the first sheet and having a surface stratum disposed adjacent the photosensitive stratum and adapted to receive a positive photographic image. The processing fluid may be supplied in a pod interposed between the sheets of the film unit and adapted to be moved through the gap between the pressure members so as to rupture the pod and distribute its contents between the sheets. The spreading device as disclosed in the following detailed description combines the advantages of accurate control of the fluid spread with a relatively simple and inexpensive construction.

FIGURES 1–3 of the drawing show the liquid distributing means of the preferred embodiment of the present invention including a pair of generally U-shaped springs 10 and 11 which serve to both support a pair of precisely formed sheet metal spreader members 14 and 15 and to urge said members toward each other. The springs are spot welded to the spreader members adjacent the outside ends thereof with great care taken to locate said welds since the forces acting on said spreader members must be applied with accuracy to achieve a uniform spread.

One of the important features of the present invention is the shape of the spreader members 14 and 15 as they converge toward one another as shown in FIGURE 1, to form a throat through which the layers of photographic sheet material are manually drawn through. The spreader members are each formed of sheet metal which has the inherent capability of being easily bent to a desired shape. Thus, a single piece of sheet metal may be cut out and bent to form a guide portion 16, the small radius sheet contacting edge 17, and the support connecting portion 18. The guide portion 16 serves to guide the sheets of photographic material 20 into the gap between the spreader members. The edge 17 is formed as precisely as economically feasible to conform to the similar edge on spreader 15 to provide a uniform spread of the developer between the sheets. The support connecting portion 18 of the spreader member is bent and shaped to provide a suitable surface for welding the end of a pair of generally U-shaped cantilever type springs 10 and 11 to each end of the spreader member.

The other spreader member 15 also has a support connecting portion 22 to which is welded the ends of the springs 10 and 11. This member has a back portion 25 which also helps to guide the sheets of film into the gap between the spreader members. The angle at which this back portion is bent is carefully controlled to provide a second small radius sheet contacting edge 26 which conforms to edge 17 on the spreader member 14.

A pair of shoulders or bumps 34 and 35, as shown in FIG. 3, are formed in one of the spreader members near the ends of the sheet contacting edge portion to pre-gap the edges apart so that the film leader 36, as shown in FIG. 2, may be manually pulled through the gap between the edges by means of the tab 37 typically heat sealed to the film leader. It should be understood that the film sheets as shown in FIGURE 1 are in processing position ready to be removed from the camera. U.S. Patent No. 2,991,702 shows a plurality of the film sheets stacked in a film pack as they are used in many of the present day self-developing cameras. In picture taking position, the negative sheet 40 with its photosensitive surface faces the open front of the film pack and the taking lens and then is pulled around and behind the positive sheet 41 by tab 37 as shown in FIGURE 1 in superposed position ready for processing. As the tab 37 pulls the leader 36 through the gap, the back portion 25 of spreader member 15 supports the leader at a position just before the gap and if the heat seals between tab 37 and the leader 36 are hard to break, this support will prevent the leader from being pulled back through the gap into the camera. The leader 36 is then manually grasped and the photographic material comprising the negative sheet 40 and the positive sheet 41 and the developer pod 42 is pulled through the gap whereby the pod is broken and the developer is uniformly spread between the positive and negative sheets.

An example of a specific embodiment of the invention as described above which in tests gave very satisfactory performance had a sheet contacting surface of 3.6 inches, a radius of curvature of the sheet contacting edges of .028 inch and a spread load of 2.75 lbs.

As stated previously, the spreading device described has performed on an equal basis with the much more costly roller system. Another important aspect of the invention has been found in relation to the pull force required to move the film sheets through the gap and the direction of pull force. Upon initial observation, it might appear that the pull force required to move the film through the gap between the static members of the present invention would be much greater than through a pair of rollers due to the well-known relationship of sliding to rolling frictional forces. However, it appears that due to the relatively small radius contacting edge surfaces of the sheet metal spreader members, the forces opposing movement of the sheets through the gap are reduced and the pull force required to move the film is equally reduced. Further advantages have been noted with the static spreader regarding a sheet of film which may be initially presented at an angle to the sheet contacting members. It has been found that the sheets follow the direction of the pull force while spreading the processing liquid uniformly between the sheets regardless of the slightly angular orientation of the sheets relative to the sheet contacting members.

Description of alternate embodiments

The embodiment of the invention as shown in FIGS. 4 and 5 includes anvil 45, the surface 46 thereof forming a rigid substantially straight portion. A spring element 48 having two pairs of resiliently connected cantilever arms 49 and 50 are fastened to said anvil and a spreader member 52 which may be integral with spring element 48 is positioned in juxtaposed relationship with the anvil surface 46 to form a narrow pressure generating gap through which the photographic sheets may be drawn. The surface of spreader bar bordering the gap is also substantially straight and arranged in parallel relationship with anvil surface 46 to achieve a spread of uniform thickness. The raised portions 53 and 54 on anvil 45 support spreader member 52 and effectively pre-gap the pressure-generating surfaces apart so that the film leader 36 as shown in FIG. 4 may be manually pulled through the gap by means of the tab 37.

FIGS. 6 and 7 show yet another embodiment of the invention including a plate member 55 which has a flat surface 56 which forms one of a pair of rigid pressure-applying members for distributing a liquid between a pair of superposed photographic sheets. The other rigid member 58 is formed integrally with a pair of arms 59 and 60 which are clamped to plate member 55 by clamps 62, 63, 64 and 65. To pre-gap the pair of rigid members apart initially so that the film leader 36 may be manually pulled through the gap by tab 37, a pair of raised surfaces 66 and 67 are provided on the plate at either side of the gap.

Since certain changes may be made in the above device without departing from the scope of the invention herein involved, it is intended that all matter contained in the above description or shown in the accompanying drawings shall be interpreted as illustrative and not in a limiting sense.

We claim:

1. In a photographic camera, apparatus for distributing a liquid as a layer between two layers of sheet material comprising, in combination:
  a pair of substantially rigid non-rolling members having substantially straight parallel adjacent portions juxtaposed to form a narrow pressure-generating gap through which said sheet material is movable; and
  spring means for supporting and aligning said members in juxtaposed relation to one another and for urging said members toward each other comprising a pair of elongated cantilever spring elements each having one end fastened to one of said rigid members at respectively opposite ends of said narrow gap and means for mounting the other one of said rigid members from the other ends of said spring elements and for stressing said spring elements to exert a predetermined initial force on said members tending to close said gap, said members being so constructed as to effect the distribution of said liquid in a layer between layers of said sheet material during movement of said material through said gap.

2. The invention of claim 1 wherein the pair of substantially rigid non-rolling members are formed of sheet metal and the pair of cantilevered spring elements are formed of rod material having a circular cross section.

3. Photographic apparatus for distributing a liquid as a layer between two layers of sheet material comprising, in combination:
  a pair of substantially rigid non-rolling members having substantially straight parallel adjacent portions juxtaposed to form a narrow pressure-generating gap through which said sheet material is movable; and
  spring means for supporting and aligning said members in juxtaposed relation to one another and for urging said members toward each other comprising a pair of elongated cantilever spring elements fastened to said rigid members at respectively opposite ends of said narrow gap with one end of each of said spring elements fastened to a respective one of said rigid members, said spring elements being stressed to exert a predetermined initial force on said members tending to close said gap, said members being so constructed as to effect the distribution of said liquid in a layer between layers of said sheet material during movement of said material through said gap.

4. The invention of claim 3 wherein at least one of said rigid members has a surface converging angularly toward said narrow gap to define a narrow throat to guide said sheet material toward said gap, said member exhibiting at the narrowest portion of said gap a sharply reduced radius of curvature to restrict the area of the member which bears on said sheet material.

5. The invention of claim 4 wherein the pair of substantially rigid non-rolling members are formed of sheet metal and the pair of cantilevered spring elements are formed of rod material having a circular cross section.

6. The invention of claim 3 wherein each of the elongated cantilever spring element is bent double to define a pair of resiliently connected cantilever arms.

7. The invention of claim 6 including pre-gap means comprising a pair of shoulders formed on at least one of said rigid members adjacent the ends of the narrow gap, said shoulders preventing the spring elements from completely closing the gap.

8. The invention of claim 3 wherein the pair of substantially rigid non-rolling members comprise an anvil having a substantially planar surface and a spreader member having an elongated substantially straight surface positioned in juxtaposed parallel relationship with said anvil surface to form the narrow pressure-generating gap through which the sheet material is movable.

9. The invention of claim 8 wherein the spring means for supporting and aligning said rigid members in juxtaposed relation to one another and for urging said members toward each other comprises two pairs of generally U-shaped resiliently connected cantilever arms which are fastened to said anvil and are formed integrally with the spreader member.

10. The invention of claim 9 wherein a pair of raised portions are provided on either side of the pressure-generating gap, said raised portions being in contact with said spreader member and spacing said spreader member a predetermined distance from said anvil surface.

11. The invention of claim 3 wherein the pair of substantially rigid non-rolling members comprise a plate member having a substantially planar surface and a spreader member having an elongated surface positioned in juxtaposed parallel relationship with said plate member surface, the spreader member being formed integrally with a pair of elongated arms clamped to the plate surface.

12. The invention of claim 11 wherein a pair of raised portions are provided on at either side of the pressure-generating gap, said raised portions being in contact with said spreader member and spacing said spreader member a predetermined distance from said plate surface.

13. In a photographic camera, apparatus for distributing a liquid in a layer between two layers of photographic sheet material, comprising, in combination:
  a pair of substantially rigid members having substantially straight parallel adjacent portions predeterminedly spaced apart to form a narrow pressure-generating gap through which said sheet material is movable in a plane, and a pair of facing surfaces on said members converging angularly toward each other to define a narrowing throat to guide said sheet material toward said narrow gap, at least one of said members exhibiting at the narrowest portion of said gap a sharply reduced radius of curvature to restrict the area of said members which bear on said sheet material; and
  a pair of elongated cantilever spring elements fastened to said rigid members at respectively opposite ends of said narrow gap with one end of each of said spring elements fastened to a respective one of said rigid members for supporting and aligning said members in juxtaposed relation to one another so that said gap is formed between them and for urging said members toward one another in a manner to affect the spreading of said liquid in a layer between the sheets of said photographic material during movement of said material through said gap.

14. The invention of claim 13 wherein the pair of substantially rigid members are formed of sheet metal and the pair of cantilevered spring elements are formed of rod material having a circular cross section.

15. Photographic apparatus for distributing a liquid in a layer between two layers of photographic sheet material, comprising, in combination:

a pair of substantially rigid members having substantially straight parallel adjacent portions predeterminedly spaced apart to form a narrow pressure-generating gap through which said sheet material is movable in a plane, and a pair of facing surfaces on said members converging angularly toward each other to define a narrowing throat to guide said sheet material toward said narrow gap, at least one of said members exhibiting at the narrowest portion of said gap a sharply reduced radius of curvature to restrict the area of said members which bear on said sheet material; and a pair of elongated cantilever spring elements fastened to said rigid members at respectively opposite ends of said narrow gap with one end of each of said spring elements fastened to a respective one of said rigid members for supporting and aligning said members in juxtaposed relation to one another so that said gap is formed between them and for urging said members toward one another in a manner to affect the spreading of said liquid in a layer between the sheets of said photographic material during movement of said material through said gap.

16. The invention of claim 15 wherein the pair of substantially rigid members are formed of sheet metal and the pair of cantilevered spring elements are formed of rod material having a circular cross section.

17. The invention of claim 16 wherein each of the elongated cantilever spring members are bent double to define a pair of resiliently connected cantilever arms.

18. The invention of claim 17 wherein the rigid members are welded to the pair of cantilevered spring elements.

19. The invention of claim 18 including pre-gap means comprising a pair of shoulders formed in at least one of said rigid members adjacent the ends of the narrow gap, said shoulders preventing the spring elements from completely closing the gap.

20. The invention of claim 19 wherein the radius of curvature of the sheet contacting portions which bear on the sheet material as it passes through the gap is approximately .028 inch and the spread load exerted by the supporting springs is 2.75 pounds.

21. Photographic apparatus for distributing a liquid in a layer between two layers of photographic sheet material, comprising, in combination:

a pair of substantially rigid sheet metal spreader members having substantially straight parallel adjacent portions predeterminedly spaced apart to form a narrow pressure-generating gap through which said sheet material is movable in a plane, and a pair of facing surfaces on said spreader members converging angularly toward each other to define a narrowing throat to guide said sheet material toward said narrow gap, each of said members exhibiting at the narrowest portion of said gap a sharply reduced radius of curvature to restrict the area of said members which bear on said sheet material; and a pair of spring elements each formed of elongated rod material bent double to define a pair of resiliently connected cantilever arms, said spring elements being permanently joined at the ends of their respective arms to each of said rigid members a respectively opposite ends of said narrow gap for supporting and aligning said spreader members in juxtaposed relation to one another so that said gap is formed between them and for urging said members toward one another in a manner to affect the spreading of said liquid in a layer between the sheets of said photographic material during movement of said material through said gap.

22. The invention of claim 21 including pre-gap means comprising a pair of shoulders formed in at least one of said rigid members adjacent the ends of the narrow gap, said shoulders preventing the spring elements from completely closing the gap.

23. Photographic apparatus for distributing a processing fluid as a layer between two layers of sheet material, comprising:

a pair of spring elements, each of said spring elements being bent double to define a pair of resiliently connected cantilever arms; and a pair of substantially rigid elongated non-rolling spreader members, each of said spreader members being fastened to the end of one arm of each said spring element so that said spreader members are supported by said spring elements in alignment with each other to form a narrow pressure-generating gap therebetween through which said gap such sheet material is movable to effect the distribution of such fluid in a layer between such two layers of such sheet material, said spreader members being resiliently displaceable in a direction away from each other against the force of said spring elements to increase the size of said gap.

24. Photographic apparatus for distributing a liquid as a layer between two layers of sheet material, comprising:

a pair of substantially rigid non-rolling members having adjacent portions juxtaposed to form a narrow gap through which such sheet material is movable; and first and second cantilever spring members each having one end fastened to one of said non-rolling members on the opposite ends of said gap with the other one of said non-rolling members mounted from the other ends of said spring members to align and support said non-rolling members and to resiliently urge said one of said non-rolling members toward said other of said non-rolling members at least when force is exerted on said non-rolling members by such sheet material passing through said gap tending to increase the size of said gap, the assembly comprising said non-rolling members and said spring members being an integral self-supporting unit.

25. Photographic apparatus for distributing a liquid as a layer between two layers of sheet material of a predetermined maximum width comprising, in combination:

a pair of substantially rigid non-rolling members having adjacent elongated portions extending at least the predetermined maximum width of such sheet material in juxtaposed relationship;

first means fastened to said members for supporting and aligning said members and for resiliently urging said portions of said members towards each other; and second means acting against the force of said first means to restrain said members in spaced relationship with a narrow pressure-generating gap disposed between said portions of said members through which such sheet material is movable to effect a distribution of such liquid in a layer between such two layers of such sheet material, said members and said first and said second means in combination forming a structurally integral self-supporting assembly.

References Cited

UNITED STATES PATENTS 3,047,387 7/1962 Land _____ 96—48
2,854,904 10/1958 Bishop _____ 95—13

NORTON ANSHER, Primary Examiner

RICHARD L. MOSES, Assistant Examiner

U.S. Cl. X.R.

95—89